United States Patent [19]

Kalyanaraman et al.

[11] Patent Number: 4,854,676
[45] Date of Patent: Aug. 8, 1989

[54] BISTABLE OPTICAL DEVICES

[75] Inventors: Palaiyur S. Kalyanaraman, Fanwood, N.J.; Anthony F. Garito, Radnor, Pa.

[73] Assignee: Hoechst Celanese Corp., Sommerville, N.J.

[21] Appl. No.: 183,077

[22] Filed: Apr. 19, 1988

[51] Int. Cl.$^4$ .............................................. G02F 1/35
[52] U.S. Cl. ................................................... 350/354
[58] Field of Search .................. 350/354, 355, 353; 372/21, 22

[56] References Cited

U.S. PATENT DOCUMENTS 4,573,767 3/1986 Jewell ................................. 350/354
4,701,030 10/1987 Jewell ................................. 350/354

OTHER PUBLICATIONS

Chastov, "Transmission of Intense Light By Semicolloidal Dye Solutions", Zh. Prikl. Spektrosk, 16(4), 1972, pp. 649–653, abstract from Chemical Abstracts, vol. 77, No. 24, item 158593v, Dec. 11, 1972.

Primary Examiner—Eugene R. LaRoche
Assistant Examiner—Nathan W. McCutcheon
Attorney, Agent, or Firm—DePaoli & O'Brien

[57] ABSTRACT

In one embodiment this invention provides a bistable optical device comprising a Fabry-Perot etalon which has an optical cavity containing a naphthalocyanine dye medium as a nonlinear optical component.

22 Claims, 1 Drawing Sheet

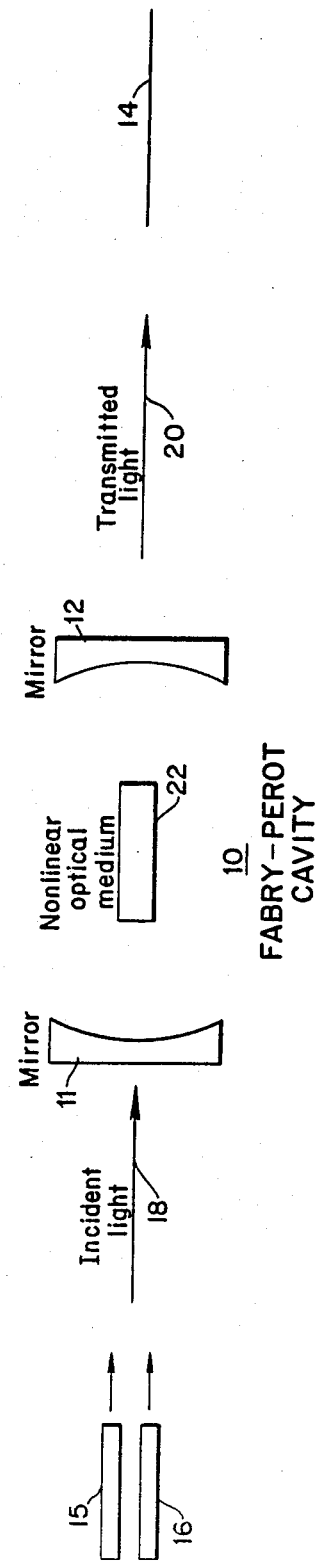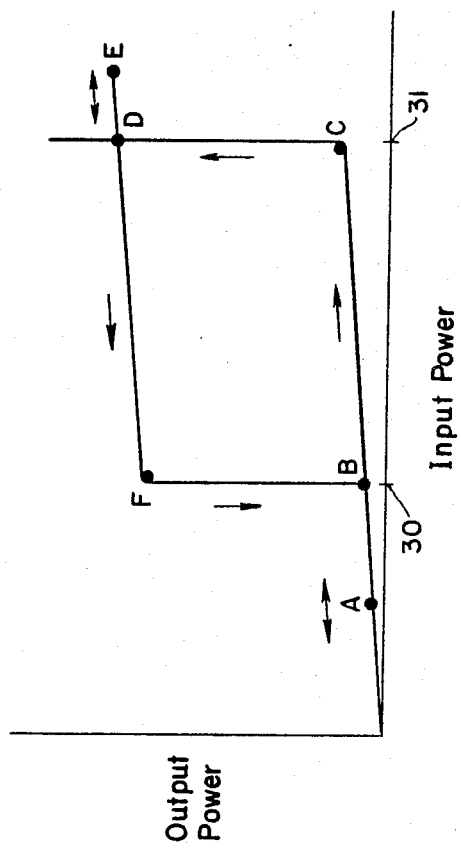

BISTABLE OPTICAL DEVICES

BACKGROUND OF THE INVENTION

Optical bistability is a phenomenon in which a nonlinear optical medium, exhibiting an index of refraction depending on the intensity of incident light, responds to an optical input beam by changing its light transmission from one value to another.

As described in Optical Bistability: controlling Light By Light (Academic Press, New York, 1985) by H. M. Gibbs, a device is optically bistable if two stable output states exist for the same value of the input over some range of imput values. Thus, the intensity transmitted through a bistable device can be plotted as a function of incident intensity. For each cycle of the incident intensity $I_{in}$, the transmission of the device remains low until $I_{in}$ is increased beyond some critical value $I\uparrow$. The transmission then remains high even as $I_{in}$ is decreased until another critical value $I\uparrow$ ($<I\uparrow$) is reached and the device switches to the off state. This type of hysteresis effect is a fundamental characteristics of optical bistability.

IEEE Spectrum, 18, 26 (1981) by P. W. Smith et al identifies four features which are important characteristics of bistable optical devices. These include a bandwidth greater than $10^{13}$ Hz; a switching time between about $10^{-9}$–$10^{-12}$ second; a capability for parallel processing; and the ability to process light directly.

Optical bistability and optical nonlinearity and related effects which are pertinent with respect to the present invention are described in publications which include Optics Commun., 19 (No. 1), 138 (1976) by M. Okuda et al; J. Chem. Soc. Faraday Trans. 2, 74, 1870 (1978) by J. McVie et al; Appl. Phys. Lett., 33(1), 24 (1978) by P. W. Smith et al; Optical Engineering, 24 (No. 1), 68(1985) by N. Peyghambarian et al; and U.S. Pat. Nos. 3,610,731; 3,745,476; 3,790,252; 4,012,699; 4,515,429; 4,558,923; and 3,813,605.

Because of its extraordinary range of optical signal processing capabilities, a bistable optical device has potential as a key component in a number of optical systems which include high-speed optical communications repeaters and terminal equipment, data communication networks, and systems for the direct optical processing of visual images.

There is increasing interest in the development of improved optical-signal processing systems using all-optical circuitry, deriving from recent advances in long-lived light sources, high quantum efficiency detectors, and low-loss high-bandwidth optical fibers.

Accordingly, it is an object of this invention to provide a bistable optical device in which the index of refraction of a intracavity medium depends on the light intensity.

It is another object of this invention to provide a bistable optical device consisting of Fabry-Perot etalon containing an organic nonlinear optical component.

Other objects and advantages of the present invention shall become apparent from the accompanying description and examples.

DESCRIPTION OF THE INVENTION

One or more objects of the present invention are accomplished by the provision of a bistable optical device with an organic nonlinear optical component comprising a solid medium of naphthalocyanine dye. The device has the capability of fast time (e.g., less than about $10^{-9}$ second) response in optical signal processing such as switching. The response time typically is in the range between about $10^{-9}$–$10^{-12}$ second.

In another embodiment this invention provides a bistable optical device to amplify variations in optical signals of a given wavelength comprising a cavity formed by at least two surfaces that reflect light of the given wavelength together with means for introducing light into the cavity and extracting light from the cavity, and which surfaces are separated at least in part by an organic nonlinear optical medium comprising a naphthalocyanine dye, which separation is of such a value and which organic nonlinear optical medium is maintained under such conditions, that either the dispersive properties of the optical medium or the selected absorptive properties dominate at the given wavelength depending on the light pulse duration, and such that there is a single valued relationship between the intensities of the incident and transmitted optical signals which exhibits gain.

In another embodiment this invention provides an optical light switch device which exhibits bistable states of light transmission, and which has a naphthalocyanine dye nonlinear optical component disposed in the optical cavity of a Fabry-Perot resonator, and the optical cavity is adapted to provide fast switching between the bistable states of light transmission through the optical cavity.

In another embodiment this invention provides a bistable optical device comprising a Fabry-Perot resonator in combination with input light power biasing means and output light power detection means; wherein the resonator optical cavity contains an organic nonlinear optical component comprising a solid medium of naphthalocyanine dye, and the optical cavity provides fast switching response between optically biased bistable states of light transmission through the optical cavity.

The organic nonlinear optical component can be situated in the optical cavity to transmit light in a waveguide configuration. The optical component also can be in a standard focal plane configuration, wherein the light transmission path is perpendicular to the plane surface of the etalon organic nonlinear optical medium. The organic nonlinear optical medium typically is a thin film which is in the form of coating on a transparent substrate such as glass or a sapphire, or an organic polymer substrate such as polymethyl methacrylate or polyurethane. Preferred nonlinear optical media are film-forming naphthalocyanine dyes or film-forming polymeric naphthalocyanine dyes.

The organic nonlinear optical medium also can be a blend of organic constituents, such as a guest/host combination of a naphthalocyanine dye and an organic polymer. Preferred host organic polymers are those which can form a solid solution with the naphthalocyanine dye, such as polyurethane, polyester, polyvinyl halide, polyamide, polyether, polysiloxane, polyacrylamide, polyvinylpyrrolidone, polyvinyl polymers with pendant side chains that exhibit nonlinear optical response, and the like.

In another embodiment this invention provides a bistable optical device as described above, in which the organic nonlinear optical component comprises a naphthalocyanine dye corresponding to the formula:

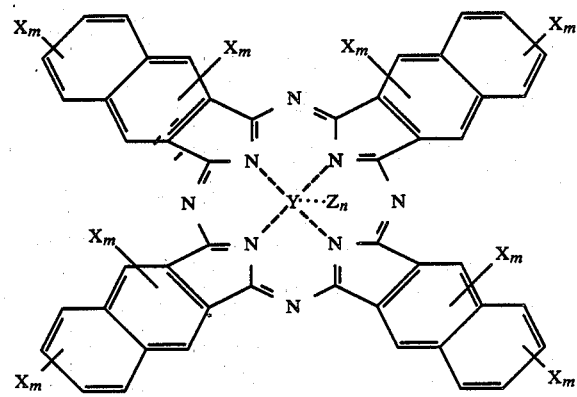

In another embodiment this invention provides a bistable optical device comprising a Fabry-Perot resonator in combination with input light power biasing means and output light power detection means; wherein the resonator optical cavity contains an organic nonlinear optical component comprising a solid medium of naphthalocyanine-containing polymer dye, and the optical cavity provides fast switching response between optically biased bistable states of light transmission through the optical cavity; and wherein the naphthalocyanine-containing polymer corresponds to the formula:

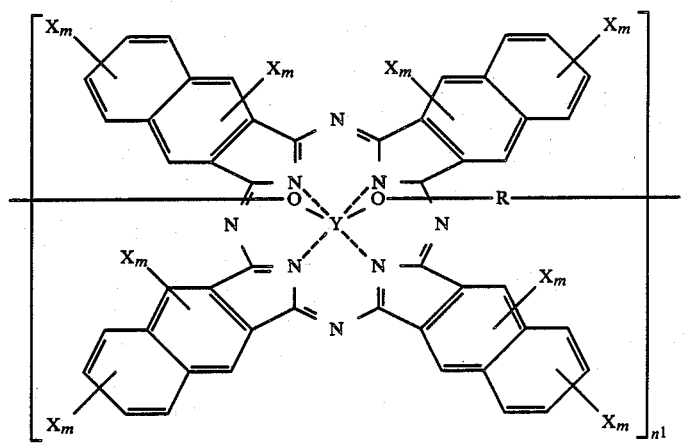

where X is hydrogen, halogen or an aliphatic, alicyclic or aromatic substituent containing 1-12 carbons atoms; Y is a silicon, germanium, vanadyl, tin, aluminum, gallium, indium, titanium, zirconium or hafnium atom; Z is halogen, hydroxyl, siloxy or an aliphatic, alicyclic or aromatic substituent containing 1-12 carbon atoms; m is an integer with a value of 1-2; and n is an integer with a value of 0-2.

Suitable aliphatic, alicyclic and aromatic substituents include $C_1$-$C_{12}$ alkyl, $C_1$-$C_{12}$ alkoxy, $C_1$-$C_{12}$ alkoylthio, $C_1$-$C_{12}$ oxyalkylene, $C_2$-$C_{12}$ alkenyl, estero, sulfonamido, organosiloxy, cyclopentyl, cyclohexyl, phenyl, alkoxyphenyl, alkenylphenyl, halophenyl, nitrophenyl, naphthyl, pyridyl, pyrimidyl, furyl, piperidyl, piperizyl, and the like.

Among the preferred naphthalocyanine dyes corresponding to the above formula are those in which at least one of the X or Z substituents imparts film-forming properties to the dye. Naphthalocyanine dyes which exhibit exceptional solubilities and film-forming properties are those in which Y is silicon and Z is an organosiloxyl or polyorganosiloxyl substituent.

Illustrative of preferred naphthalocyanine dyes are bis(tri-n-hexylsiloxy)silicon naphthalocyanine; bis(N-palmitoylaminohexyloxydimethylsiloxy)silicon naphthalocyanine; dichlorosilicon poly-N-di-n-octylsulfonamidonaphthalocyanine; dihydroxysilicon poly-N-di-n-octylsulfonamidonaphthalocyanine; bis(tri-n-hexylsiloxy)silicon poly-N-di-n-octylsulfonamidonaphthalocyanine; bis(hydroxyheptapropyleneoxydimethylsiloxy)silicon tetrachloronaphthalocyanine; bis(trihexylsiloxy)silicon tetraneopentoxynaphthalocyanine; bis(trihexylsiloxy)silicon tetra-N-piperidylnaphthalocyanine; and the like.

where X is hydrogen, halogen or an aliphatic, alicyclic or aromatic substituent containing 1-12 carbon atoms; Y is a silicon, germanium, vanadyl, tin, aluminum, gallium, indium, tetanium, zirconium or hafnium atom; R is a divalent aliphatic, alicyclic or aromatic substituent containing 2-200 carbon atoms; m is an integer with a value of 1-2; and $n^1$ is an integer with a value of at least 2.

The weight average molecular weight of the naphthalocyanine-containing polymer illustrated above typically will be in the range between about 3000-60,000.

The divalent R radical in the polymer formula can be alkylene, oxyalkylene, oxyphenylene, polyestero, polyamido, polyorganosiloxyl, and the like.

General procedures for synthesis of naphthalocyanines are exemplified by the following reaction schemes:

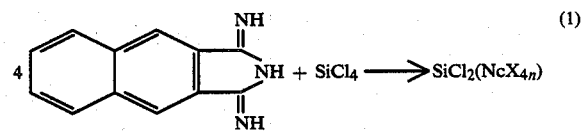

(1)

(2)

(3)

The symbols Nc, X, m and n are as previously defined. The symbol G refers to a leaving group during the nucleophilic aromatic substitution reaction.

Detailed descriptions of methods for the synthesis of naphthalocyanines are set forth in copending patent applications Ser. No. 698,206 and Ser. No. 698,210, filed Feb. 4, 1985, respectively; and in patent application Ser. No. 127,457, filed Dec. 2, 1987.

Naphthalocyanines have important advantages for utility as the nonlinear optical medium in a Fabry-Perot resonator.

For example, naphthalocyanines can be custom synthesized with relative ease and efficiency by means of known procedures.

Naphthalocyanines have excellent solubility in a wide range of common organic solvents.

In preferred embodiments, naphthalocyanines are film-forming and can be applied as a coating with a high concentration of chromophores for utility as a superior nonlinear optical medium.

Because of the highly extended conjugated double bond electronic configuration provided by the multiple benzoisoindoline structures, a naphthalocyanine dye exhibits an exceptional degree of nonlinear optical susceptibility. This has the beneficial effect of imparting a high optical efficiency to a Fabry-Perot resonator device when the naphthalocyanine dye is utilized as the nonlinear optical medium in the optical cavity.

BRIEF DESCRIPTION OF THE DRAWINGS

FIG. 1 is a schematic diagram of a Fabry-Perot bistable optical switch.

FIG. 2 is a graphical representation of the input power versus the output power of a Fabry-Perot resonator illustrating an optical bistability effect.

Referring to FIG. 1, the Fabry-Perot resonator 10 consists of two partially-transmitting mirrors 11 and 12 which are oppositely arranged on a common axis 14. The mirrors 11 and 12 are partially reflecting and partially transmitting.

A bias pumping source 15 provides input power for placing the Fabry-Perot resonator in a desired transmission state. A trigger pumping source 16 is provided for switching the resonator between different transmission states to effect optical bistability.

Incident light 18 is applied to mirror 11 and partially transmitted into Fabry-Perot cavity 10. The transmitted light reflects back and forth between mirrors 11 and 12. A portion of the light in Fabry-Perot cavity 10 is transmitted through mirror 12 as beam 20. If the length of Fabry-Perot cavity 10 corresponds to an integral number of half-wavelengths of incident light 18, then successive transmitted beams will be in phase and will interfere constructively to produce a strong transmitted beam 20.

In order to transform Fabry-Perot resonator 10 into a bistable optical device, an organic nonlinear optical medium 22 is interposed in Fabry-Perot cavity 10 between mirrors 11 and 12. Organic nonlinear optical medium 22 (e.g., a saturable absorber dye) exhibits a significant intensity dependent index of refraction as a function of the intensity of the light passing through the medium.

The use of organic nonlinear optical medium 22 with an index of refraction which is a function of the intensity of light propagating through the medium permits control over the optical path length of medium 22, and consequently the optical path length in Fabry-Perot cavity 10.

Optical bistability occurs when the optical length within medium 22 depends on the light intensity in Fabry-Perot cavity 10, and the light intensity in Fabry-Perot cavity 10 depends on its optical pathlength. Because medium 22 has an optical length which is a function of light intensity, the optical pathlength in the Fabry-Perot resonator is proportional to the light intensity within cavity 10. This intensity, in turn, is proportional to the transmitted power of beam 20.

Referring to FIG. 2, a hysteresis effect is graphically represented between input power points 30 and 31, with respect to Fabry-Perot cavity 10 in FIG. 1. At a low input power, such as that corresponding to point A, there is a negligible nonlinear effect and light transmission 20 from Fabry-Perot cavity 10 in FIG. 1 is low. As the input optical pumping power from bias pumping source 15 is increased, the power in the resonator begins to build up, but the transmission remains relatively low until point C in FIG. 2 is reached. At higher input powers, the bistable optical device suddenly switches to a high output power transmission state corresponding to point D, and the low transmission state is extinguished.

Physically, the increased light bias in cavity 10 changes the refractive index within nonlinear optical medium 22 thereby tuning the resonator closer to resonance, and increasing the light power within cavity 10 and creating a positive feedback effect. A further increase in input power to point E in FIG. 2 tunes the resonator away from resonance. This reduces the power in cavity 10, and is a negative feedback effect which stabilizes the output power.

In FIG. 2 it is observed that there are two stable transmission states, a high transmission state and a low transmission state, for each input power between points 30 and 31. When the FIG. 1 Fabry-Perot resonator is biased with an input power between points 30 and 31 in FIG. 2, there are two stable transmission states at each power point in this range. For input powers less than point 30 in FIG. 2, the high transmission state no longer exists, and the optical device switches to the low transmission state corresponding to point B. Physically, the input power in the Fabry-Perot resonator no longer is sufficient to keep cavity 10 tuned near optical resonance.

The following examples are further illustrative of the present invention. The components and specific ingredients are presented as being typical, and various modifications can be derived in view of the foregoing disclosure within the scope of the invention.

EXAMPLE I

This Example illustrates the preparation of bis(chlorodimethylsiloxy)silicon naphthalocyanine.

To a dry 500 ml three-necked round bottom flask (equipped with magnetic stirring, a Dean-Stark moisture receiver, a reflux condenser, and a dry nitrogen purge) are added 300 ml of dry pyridine (freshly distilled from calcium hydride), 2.0 g (2.58 mmoles) of dihydroxysilicon naphthalocyanine, and 20 ml of tri-n-butylamine. The mixture is heated to reflux and moisture is removed by azeotropic distillation.

The reaction mixture is cooled to room temperature and 8.0 ml (62 mmoles) of dichlorodimethylsilane is added. The mixture is stirred for 18 hours at room temperature, then the excess dichlorodimethylsilane is distilled from the reaction mixture to yield a residual crude product which is employed as a starting material in Example II.

EXAMPLE II

This Example illustrates the preparation of bis(hydroxyheptapropyleneoxydimethylsiloxy)silicon naphthalocyanine which exhibits film-forming properties.

To the reactor containing the crude bis(chlorodimethylsiloxy)silicon naphthalocyanine product of Example I is added a 2.19 g (5.16 mmoles quantity of polypropylene glycol (425 average molecular weight). The stirred mixture is refluxed for about two hours under dry nitrogen. The product solution is cooled to room temperature, and then stripped of its volatile components under vacuum. The resultant residual green oil is dissolved in diethyl ether, and the solution is extracted with dilute HCl, and then washed with water. The product solution is dried over calcium sulfate, and the solvent is stripped under vacuum.

The $SiNc[OSi(CH_2)_2O(CHCH_3CH_2O)_7H]_2$ product is a green solid with a melting point near 120° C. It is readily soluble in dichloromethane and other organic solvents.

EXAMPLE III

This Example illustrates the preparation of $HOCH_2CH_2CH_2NH(EMPOL-1010)NHCH_2CH_2NH(EMPOL-1010)NHCH_2CH_2OH$.

To a dry 500 ml three-necked round bottom flask (equipped with mechanical stirring, Dean-Stark moisture receiver, a reflux condenser, and dry nitrogen purge) are added 13.52 g (0.18 mole) of 3-amino-1-propanol, 5.41 g (0.09 mole) of 1,2-diaminoethane, and 102.24 g (0.18 mole) of Empol-1010 (Emery Industries, Cincinnati, Ohio). The stirring mixture is heated slowly to 250° C. over a two hour period under nitrogen, while the water byproduct is collected in the moisture receiver. The reaction mixture is stirred for two hours at 250° C. under 1 atm of nitrogen, and then heated at 250° C. for another hour under reduced pressure (P < 1 torr). A 113.56 g (99% yield) quantity of a tacky, clear yellow solid with a broad melting range near 50° C. is recovered as a crude product.

EXAMPLE IV

This Example illustrates the preparation of $SiNc[OSi(CH_3)_2OCH_2CH_2CH_2NH(Empol-1010)NHCH_2CH_2NH-(Empol-1010)NHCH_2CH_2CH_2OH]_2$ which exhibits film-forming properties.

To a product solution from the preparation of bis(-chlorodimethylsiloxy)silicon naphthalocyanine in accordance with Example I is added a pyridine solution of 7.24 g (5.68 mmoles) of alcohol-terminated monomer prepared in accordance with Example III. The reaction mixture is refluxed for two hours, and then cooled to room temperature. The reaction mixture is poured into a mixture of 400 ml of water and 200 ml of ethanol to precipitate the product as a green solid. The product is recovered by filtration, and dissolved in chloroform.

The product solution is extracted with dilute HCl, and washed with water, and the chloroform solvent is removed under vacuum. The resultant product is dark green film-forming solid (yield 6.89 g).

The product is dissolved in 1,1,2,2-tetrachloroethane to form a 30 weight percent solution for use in spin coating of substrates.

Thin glass plates are thoroughly cleaned by first treating which chromic acid solution, repeatedly rinsing with distilled water, and then with 1,1,2,2-tetrachloroethane. The plates are dried under vacuum at 65° C. prior to coating.

In the spin coating step a glass plate is mounted on a spin coater and completely flooded with the green product solution. The plate then is spun at a rate (250 to 1000 rpm) for a period of about 20–60 seconds as required to achieve the desired coating thickness. The coated plate is baked in a vacuum oven at 65° C. to remove 1,1,2,2-tetrachloroethane solvent.

The coated glass plate is suitable for use as the nonlinear optical medium in a present invention bistable optical device. The coated plate can be positioned between two parallel mirror surfaces to form a Fabry-Perot etalon.

A coated glass plate can be modified further for use in a waveguide configuration. In one embodiment, a strip waveguide is formed by exposing the coated plate to high intensity light (greater than one $GW/cm^2$) near 810 nm through a mask to remove the polymer film in the exposed regions by molecular transport, leaving a polymer strip waveguide in the unexposed regions under the mask. In a further planar waveguide embodiment, the parallel glass plate sides at each end of the organic film waveguide are attached to parallel, partially transmitting mirrors. These types of waveguide structures can function as Fabry-Perot etalons.

EXAMPLE V

This Example illustrates the preparation of sulfonamide-substituted silicon naphthalocyanine which exhibits film-forming properties.

A mixture of dihydroxysilicon naphthalocyanine (0.4 g) and chlorosulfonic acid (1.3 ml) is stirred for 6 hours at 65° C. The formed product mixture is poured onto ice (100 g) which has been cooled with dry ice. The resultant slurry is filtered, and after washing with ice water, the recovered solid product is dried under vacuum, yield 0.66 g. The product is $Si(OH)_2[Nc(SO_2Cl)_5]$.

A mixture of the above product (0.50 g) and di-n-octylamine (5.0 ml) is stirred at 63° C. for two hours. A solid crude product is separated by filtration, washed with acetone and then with water, and dried under vacuum (yield 0.62 g). The product is a dark green solid having the structural formula: $Si(OH)_2Nc\{SO_2N[(CH_2)_7CH_3]_2\}_5$.

EXAMPLE VI

This Example illustrates the preparation of bis(hydroxyheptapropyleneoxydimethylsiloxy)silicon tetrachloronaphthalocyanine which exhibits film-forming properties.

A mixture of dichlorosilicon tetrachloronaphthalocyanine (1.07 g) and concentrated sulfuric acid (40 ml) is stirred for 30 minutes. The reaction mixture is poured onto ice (100 g) and the resulting suspension is filtered. The recovered solid is washed with acetone:-water (1:1). The solid then is slurried with concentrated ammonia (30 ml) and the slurry mixture is refluxed for 1 hour. The green solid product is separated by filtration, washed with water, and then acetone, and dried under vacuum. A 0.89 yield (87%) of dihydroxysilicon tetrachloronaphthalocyanine is obtained.

To a dry 500 ml three-necked round bottom flask (equipped with magnetic stirring a Dean-Stark moisture receiver, a reflux condenser, and a dry nitrogen purge) are added 300 ml of dry pyridine, 2.00 g (2.19 mmoles)

of dihydroxysilicon tetrachloronaphthalocyanine, and 20 ml tri-n-butylamine. The mixture is heated to reflux and water is removed continuously by azeotropic distillation.

The reaction mixture is cooled to room temperature, and 8.0 ml (62 mmoles) of dichlorodimethylsilane is added. The mixture is stirred at room temperature for 18 hours, then the excess dichlorodimethylsilane is distilled from the reaction mixture. To this reaction mixture is added 1.86 g (4.38 mmoles) of polypropylene glycol (425 average molecular weight). The stirring mixture is refluxed for 1.75 hours under dry nitrogen. The product solution is cooled to room temperature, and volatile components are stripped under vacuum. The resultant green oil is dissolved in diethyl ether, extracted with dilute HCl, and then washed with water. The ether solution is dried over calcium sulfate, and then the ether solvent is removed under vacuum. The product is recovered as a green solid that is readily soluble in organic solvents such as dichloromethane; 1,2-dichloroethane; trichloroethylene; 1,1,2,2-tetrachloroethane; 2-butanone; cyclohexanone; and 1-butanol.

EXAMPLE VII

This Example illustrates the preparation of SiNC-[OSi(CH$_3$)$_2$OCH$_2$CH$_2$NHCOCH$_3$]$_3$ which exhibits film-forming properties.

A two liter round bottom three-necked flask is equipped with mechanical stirring, a Dean-Stark moisture receiver with overhead condenser and thermometer, a heating mantle, and a dry nitrogen atmosphere. The flask is charged with SiNc[OH]$_2$ (7.09 g, 9.15 mmoles), 59 ml of tributylamine, and 900 ml of pyridine. The stirred slurry is heated to reflux and 435 ml of distillate is removed from the reactor through the moisture receiver. The dried reaction mixture is cooled to room temperature, and dichlorodimethylsilane (30 ml, 32 g, 250 mmoles) is added to the reactor. The reaction mixture is stirred at room temperature for about 18 hours.

The reaction mixture then is heated to reflux and 228 ml of distillate is removed. The reaction mixture is cooled to below reflux temperature and N-acetylethanolamine (3.78 g, 36.6 mmoles) is added. The reaction mixture is refluxed for four hours, then the hot reaction mixture is filtered to provide a dark green solid (1.72 g) and a deep green filtrate. The pyridine filtrate is poured into a solution of 30 g of concentrated hydrochloric acid in 1000 ml of water to precipitate the product as a green solid. The product is collected by filtration, washed twice with water, and then dried at 60° C. in a convection oven to yield 62.8%).

EXAMPLE VIII

This Example illustrates the preparation of bis(N-palmitoylaminohexyloxydimethylsiloxy)silicon naphthalocyanine, SiNc[OSi(CH$_3$)$_2$—O—(CH$_2$)$_6$—NH-CO—(CH$_2$)$_{14}$—CH$_3$]$_2$, which exhibits film forming properties.

A.

A 1 liter three-necked reaction flask (equipped with a heating mantle, mechanical stirrer, N$_2$ atmosphere, a 200 ml additional funnel and a reflux condenser) is charged with 18.52 g of 6-amino-1-hexanol, 32.34 g of tributylamine and 30 ml of tetrahydrofuran. A 43.54 quantity of palmitoyl chloride dissolved in 135 ml of tetrahydrofuran is added from the funnel over a 10 minute period to the reactor while the reaction medium is heated at reflux temperature. After the addition is completed, the reaction mixture is refluxed for 2 hours and then cooled to room temperature to form a colorless solid precipitate. A 100 ml quantity of water is added to the reactor and cooled in an ice bath to precipitate more solid. The colorless solid is collected by filtration, washed with 500 ml water, and air-dried. This crude N-palmitoyl-6-amino-1-hexanol product is recrystallized from methanol, yielding 50 g (89%) of shiny white flakes, mp 102°–103° C.

B.

Following the procedure of Example I, 20 g of dihydroxysilicon naphthalocyanine is converted to bis(chlorodimethylsiloxy)silicon naphthalocyanine in a 5 liter flask.

A 36.7 g quantity of N-palmitoyl-6-amino-1-hexanol in 500 ml of dry pyridine is added to the flask, and the contents are refluxed for 4 hours. The resultant product mixture is filtered while hot, and the filtrate is poured with stirring into 1500 ml of water containing 85 g of 37% hydrochloric acid.

The green solid which precipitates is washed with water, and air-dried. The precipitate is reduced to a powder, transferred to a one liter Erlenmeyer, and extracted twice with hot methanol. The methanol-insoluble green solid is dissolved in a liter of 1,1,2-trichloroethane, and the solution is filtered, and the filtrate is reduced to dryness in a rotatory evaporator to provide 21.55 g (52.2% yield) product in the form of a green powder.

C.

Following the procedure described in Example IV, glass substrates are spin coated with a cyclohexanone solution of the above described naphthalocyanine product. Using a Headway Spinner (Model 1-EC101D-R485), 2"×" glass plates are coated by spinning at 2000 rpm for 60 seconds. The coated plates are baked in a convection oven at 80° C. for two hours. The average thickness of the transparent coating is 850 angstroms, as measured with a surface profilometer (Dektak Model 2A).

Following the same procedure, a 95% reflective mirror (1" diameter, 1 mm thickness) is spin coated with a solution of naphthalocyanine dye on the nonreflective surface. The coated mirror is employed as one of the two mirrors in a Fabry-Perot resonator in accordance with the present invention, and optical bistability is measured as described in Example IX.

EXAMPLE IX

This Example illustrates the construction and operation of a bistable optical device in accordance with the present invention.

A.

Measurement Of The Threshold Power For Nonlinear Absorption

A laser and optical detection system is devised for 30 ps and 10 ns pulses, employing a naphthalocyanine nonlinear optical medium in a Fabry-Perot cavity as provided in Example VII.

A Nd:YAG pumped ethane gas Raman cell is used to obtain the first Anti-Stokes line 813 nm, resonant with the linear absorption peak of the naphthalocyanine dye. The ethane gas Raman cell pumped by Quantel YAG 501 picosecond laser system gives the 30 GHz bandwidth 30 ps pulse with the energy 200 μJ per pulse, which can be focused to provide a light intensity of more than 50 MW/cm$^2$.

The nanosecond pulse of 30 GHz bandwidth with the energy 20 μJ per pulse is obtained in the same way by employing the Quanta-Ray DCR Nd:YAG laser system and the light intensity of 500 KW/cm$^2$. The overall power fluctuation is larger for the 10 ns pulse since the Quanta-Ray laser oscillator is designed to operate in the spatially multi-mode, while the Quantel picosecond laser yields a nearly TEM$_{oo}$ output. Any fluctuation in the beam direction that might be due to the Raman scattering is eliminated by deployment of the diffuser in front of the PIN Silicon photodiodes, and by preamplification of the signal which is read by the gated charge integrater CAMAC system.

B.

Dispersion Of The Nonlinear Absorption

The Ar$^+$ pumped Dye laser is used to measure the dispersion of the nonlinear absorption. The Spectra-Physics model 380B cw Ring Dye laser with the LDS dye is tunable between 790 nm and 860 nm with a typical peak power of 150 mW when pumped by the 8.0 Watt of all the lines of Ar$^+$ laser. The cw dye output with the 5 MHz bandwidth is chopped by the acousto-optic modulator down to the 10 μs pulse before impinging the sample with the duty cycle of $10^{-4}$ to avoid any heating effect. The light intensity of the maximum 80 KW/cm$^2$ is obtained by use by use of a microscope lens.

C.

Optical Bistability

Each optical system is basically the same as for the measurement of nonlinear absorption dispersion, except that the naphthalocyanine dye nonlinear optical medium is disposed in the focal plane of a Fabry-Perot cavity (burleigh RC-110 Fabry-Perot Interferometer).

The free spectral range of the cavity is adjustable, and is set at 12.5 GHz to allow space for moving the sample into and out of the cavity. The initial cavity mistuning is adjusted by varying the high voltage applied to a PZT annular ring that holds the output mirror (The PZT has total motion of 2.21 μm/1000 V). When the output mirror is scanned with the nonlinear optical medium in place, the Fabry-Perot interference pattern is obtained with a finesse of 2.

The light pulse shape and duty cycle for pulse duration over the range $10^{-6}$-1 second is controlled by AOM modulator (NRC N23080, Spectral Range 440-850 nm, Deflection Efficiency 50% at 813 nm) which is driven by AOM driver (NRC N21080-1SAS, Carrier Frequency 80 MHz). The driver can be run either in cw mode or in external mode. In the external mode, the output from a function generator (Wavetek Model 275, 12 MHz) is connected to the external AM input to give a variable form of pulses.

For light pulse durations of 30 ps and 10 ns, the laser sources described above are utilized.

The first mirror of the Fabry-Perot cavity is replaced with a naphthalocyanine coated mirror of the type described in Example VIII, which functions as a partially reflecting and transmitting mirror and as a nonlinear optical medium.

Before the Fabry-Perot cavity, the pulsed fundamental input is partially reflected by a pellicle beam splitter to the reference silicon detector, and the transmitted beam is tightly focused on the naphthalocyanine film in order to achieve the maximum power density in the dye nonlinear optical medium. The outcoming fringe is collimated and passed through a several micron size pinhole. The sample silicon detector monitors the intensity at the central part of "Bull's eye" interference fringe. The reference arm intensity and the sample arm intensity are displayed on an oscilloscope in the x-y mode.

D.

Bistability Measurement

The input power is plotted versus the product of the linear absorptivity coefficient ($\alpha$) and the length (L) to show the dependence of the dye absorption coefficient on the incident light intensity for 30 ps and 10 ns pulses.

The change in $\alpha$L is reproducible up to many cycles of the increase and decrease of the light intensity. The data points for the 10 ns is more scattered due to the power fluctuation of the pumping YAG laser.

If the light intensity is increased more than the maximum of the data points, i.e., 30 MW/cm$^2$ for 30 ps and 200 KW/cm$^2$ for 10 ns, irreversible hole burning is observed, which is apparently due to mass transport of the dye film along the substrate surface.

A plotted solid line is the least square fitting curve assuming the Bloch-type saturation on the resonance, i.e., $$\alpha(I)L = \frac{\alpha_0 L}{1 + I/I_0}, \tag{1}$$

where $I_O$ is the threshold power for the saturation, $\alpha_O L$ gives the low intensity linear absorption.

The values of the parameters are as follows:

|       | $I_o$ | $\alpha_o L$ |
|-------|-------|--------------|
| 30 ps | 160 MW/cm$^2$ | 1.41 |
| 10 ns | 680 KW/cm$^2$ | 1.39 |

Taking the reflection off the front surface into consideration the threshold powers for the saturation are 100 MW/cm$^2$ and 440 KW/cm$^2$ for the 30 ps and 10 ns pulses, respectively.

An important advantage of a naphthalocyanine dye nonlinear optical medium is the absence of an unsaturable background absorption. The optical transition involved is the zero-phenon $\pi$-$\pi$* electronic transition with a narrow line width (10 MHz in free-base phthalocyanine).

The threshold power for the 10 ns pulse is lower than that of the 30 ps pulse, but there is a saturation in the threshold power as seen by the 10 μs pulse where a 20% decrease in the absorption coefficient is observed at a light intensity of 80 KW/cm$^2$.

The pulse duration dependence of the threshold power is explained by the two level system interacting with the incident resonant light. The results of the numerical analysis of the rate equations describing the interaction of the two level system with the incident resonant light are plotted for the various pulse widths. It is assumed that the lifetime of the relaxing excited state is about 1 ns. From the graphs, the threshold power for the different pulse durations are determined. The ratio of the threshold powers for the 30 ps to the 10 ns is of the order of 100, while the ratio obtained from experiment is 230.

From the nonlinear absorption coefficient the nonlinear refractive index $n_2$ can be estimated. The susceptibility for the Bloch type system is given as $$\chi(\omega) = \frac{\alpha c}{4\pi\omega} \frac{\Delta + i}{1 + \Delta^2 + I/I_s}, \quad (2)$$

where $\alpha$ is the linear absorption coefficient, $\Delta$ is the detuning $(\omega - \omega_0)/\Gamma$, and $I_s$ is the saturation power.

Then the nonlinear refractive index $n_2$ is the derivative of the intensity dependent refractive index $n$ with respect to the intensity $I$, which is $$n_2 = -\frac{\alpha\lambda}{4\pi I_s} \cdot \frac{\Delta}{(4 + \Delta^2)^2} \quad (3)$$

From this expression the maximum value of the $n_2$ of the naphthalocyanine medium is $1 \times 10^{-4}$ cm$^2$/kw.

The dispersion of the nonlinear absorption is plotted against the linear absorption spectrum. The change in the absorption is maximum at the resonance and decreases in both directions away from the peak. Lines are plotted which are the least square fit for the linear absorption assuming the Gaussian envelope and the dispersion derived from the Kramers-Kronig relation. Other plotted lines are the fitted curves for the nonlinear absorption and dispersion. It is seen that the maximum change of the refractive index occurs at $\lambda = 840$ and 780 nm.

In general the distribution of the local field at each molecule determines the shape of the inhomogeneous broadening line shape. It is presumed that the spectrum of the naphthalocyanine medium has the Gaussian inhomogeneous broadening envelope over the Lorentzian, Block type homogeneously broadened transitions, then the maxima in $n_2$ at $\lambda = 840$ and 780 nm result from the linear superposition of the changes in the refractive index of each optical transition.

Optical bistability effects are observed with the above described optical systems for pulse widths from $10^{-9}$–1 second with duty cycles of 20%. Depending on the pulse width and the wavelength, the bistability is due to either electronic or electronic-thermal induced intensity dependent refractive index change. Thus, for puse durations in the range of $10^{-6}$–1 second and wavelength of 813 nm, for example, the bistability apparently is due to electronic-thermal induced changes. There is an initial cavity tuning dependence, which indicates the effect is dispersive rather than absorptive even if the dye laser output frequency is resonant with the linear absorption peak of the dye. For the zero mistuning ($\phi_0 = 0.0$), no bistability is observed in either case. For negative $\phi_0$ (−0.63 and −1.0), the bistability loop has counter-clockwise circulation, and for the positive $\phi_0$ (1.8 and 0.75), the bistability loop has clockwise circulation.

In the short pulse duration region $10^{-9}$–$10^{-12}$ second, the bistability is due to electronic induced changes. Thus, for 10 ns pulses there is a cavity tuning dependence which indicates the bistability is absorptive rather than dispersive.

What is claimed is:

1. A bistable optical device to amplify variations in optical signals of a given wavelength comprising a cavity formed by at least two surfaces that reflect light of the given wavelength together with means for introducing light into the cavity and extracting light from the cavity, and which surfaces are separated at least in part by an organic nonlinear optical medium comprising a naphthalocyanine dye, which separation is of such a value and which organic nonlinear optical medium is maintained under such conditions, that either the dispersive properties of the optical medium or the selected absorptive properties dominate at the given wavelength depending on the light pulse duration, and such that there is a single valued relationship between the intensities of the incident and transmitted optical signals which exhibits gain.

2. An optical light switch device which exhibits bistable states of light transmission, and which has a naphthalocyanine dye nonlinear optical component disposed in an optical cavity of a Fabry-Perot resonator, and the optical cavity is adapted to provide less than about $10^{-9}$ second range switching between the bistable states of light transmission through the optical cavity.

3. A bistable optical device comprising a Fabry-Perot resonator in combination with input light power biasing means and output light power detection means; wherein the resonator optical cavity contains an organic nonlinear optical component comprising a solid medium of naphthalocyanine dye, and the optical cavity provides between about $10^{-9}$–$10^{-12}$ second range switching response between optically biased bistable states of light transmission through the optical cavity.

4. A bistable optical device in accordance with claim 3 wherein the device has a waveguide configuration.

5. A bistable optical device in accordance with claim 3 wherein the device has a focal plane configuration.

6. A bistable optical device in accordance with claim 3 wherein the organic nonlinear optical component comprises a blend of a naphthalocyanine dye and a thermoplastic polymer.

7. A bistable optical device in accordance with claim 3 wherein the organic nonlinear optical component comprises a film-forming naphthalocyanine dye.

8. A bistable optical device in accordance with claim 3 wherein the organic nonlinear optical component comprises a film-forming polymeric naphthalocyanine dye.

9. A bistable optical device in accordance with claim 3 wherein the organic nonlinear optical component comprises a naphthalocyanine dye corresponding to the formula:

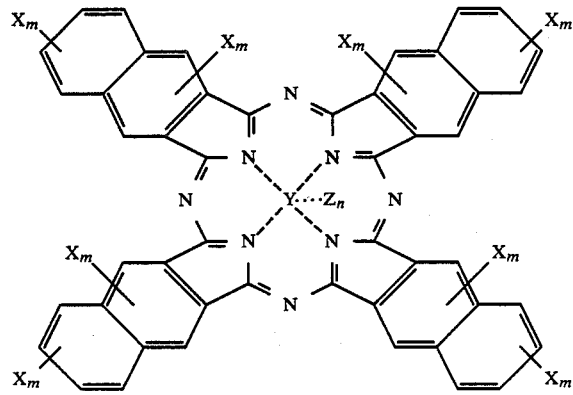

where X is hydrogen, halogen or an aliphatic, alicyclic or aromatic substituent containing 1-12 carbon atoms; Y is a silicon, germanium, vanadyl, tin, aluminum, gallium, indium, titanium, zirconium or hafnium atom; Z is halogen, hydroxyl, siloxy or an aliphatic, alicyclic or aromatic substituent containing 1-12 carbon atoms; m is an integer with a value of 1-2; and n is an integer with a value of 0-2.

10. A bistable optical device in accordance with claim 9 wherein at least one of the X or Z substituents in the formula imparts film-forming properties to the naphthalocyanine dye component.

11. A bistable optical device in accordance with claim 9 wherein at least one of the Z substituents in the formula is a polyorganosiloxane.

12. A bistable optical device in accordance with claim 9 wherein the napthalocyanine dye component is bis(tri-n-hexylsiloxy)silicon naphthalocyanine.

13. A bistable optical device in accordance with claim 9 wherein the naphthalocyanine dye component is dichlorosilicon poly-N-di-n-octylsulfonamidonaphthalocyanine.

14. A bistable optical device in accordance with claim 9 wherein the naphthalocyanine dye component is dihydroxysilicon poly-N-di-n-octylsulfonamidonaphthalocyanine.

15. A bistable optical device in accordance with claim 9 wherein the naphthalocyanine dye component is bis(tri-n-hexylsiloxy)silicon poly-N-di-n-octylsulfonamidonaphthalocyanine.

16. A bistable optical device in accordance with claim 9 wherein the napthalocyanine dye component is bis(hydroxyheptapropyleneoxydimethylsiloxy)silicon tetrachloronaphthalocyanine.

17. A bistable optical device in accordance with claim 9 wherein the naphthalocyanine dye component is bis(trihexylsiloxy)silicon tetraneopentoxynaphthalocyanine.

18. A bistable optical device in accordance with claim 9 wherein the naphthalocyanine dye component is bis(trihexylsiloxy)silicon tetra-N-piperidylnaphthalocyanine.

19. A bistable optical device in accordance with claim 9 wherein the naphthalocyanine dye component is bis(N-palmitoylaminohexyloxydimethylsiloxy)silicon naphthalocyanine.

20. A bistable optical device in accordance with claim 3 wherein the organic nonlinear optical component comprises a naphthalocyanine-containing polymer corresponding to the formula:

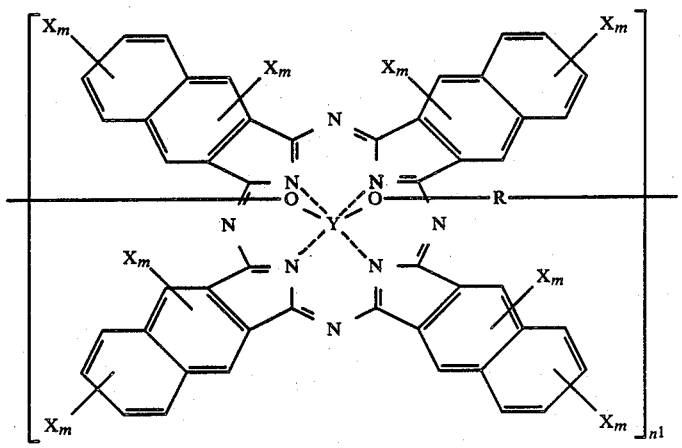

where X is hydrogen, halogen or an aliphatic, alicyclic or aromatic substituent containing 1-12 carbon atoms; Y is a silicon, germanium, vanadyl, tin, aluminum, gallium, indium, titanium, zirconium or hafnium atom; R is a divalent aliphatic, alicyclic or aromatic substituent containing 2-200 carbon atoms; m is an integer with a value of 1-2; and $n^1$ is an integer with a value of at least 2.

21. A bistable optical device in accordance with claim 20 wherein R in the formula is divalent polyorganosiloxane.

22. A bistable optical device in accordance with claim 20 wherein the polymer has a weight average molecular weight between about 3000-60,000.

* * * * *